US011998497B2

(12) United States Patent
Masouros et al.

(10) Patent No.: US 11,998,497 B2
(45) Date of Patent: Jun. 4, 2024

(54) DEVICE FOR SUPPORTING A BODY PART

(71) Applicant: Imperial College of Science, Technology and Medicine, London (GB)

(72) Inventors: Spyridon Masouros, London (GB); Grigorios Grigoriadis, London (GB); Colin Boyle, London (GB)

(73) Assignee: IMPERIAL COLLEGE INNOVATIONS LIMITED, London (GB)

( * ) Notice: Subject to any disclaimer, the term of this patent is extended or adjusted under 35 U.S.C. 154(b) by 406 days.

(21) Appl. No.: 17/275,852

(22) PCT Filed: Sep. 12, 2019

(86) PCT No.: PCT/GB2019/052549
§ 371 (c)(1),
(2) Date: Mar. 12, 2021

(87) PCT Pub. No.: WO2020/053586
PCT Pub. Date: Mar. 19, 2020

(65) Prior Publication Data

US 2022/0040017 A1 Feb. 10, 2022

(30) Foreign Application Priority Data

Sep. 12, 2018 (GB) ..................................... 1814813

(51) Int. Cl.
*A61G 5/00* (2006.01)
*A47C 27/08* (2006.01)
(Continued)

(52) U.S. Cl.
CPC .......... *A61G 5/1043* (2013.01); *A47C 27/083* (2013.01); *A61G 7/05769* (2013.01); *A61G 2203/34* (2013.01)

(58) Field of Classification Search
CPC .......... A61G 5/00; A61G 5/10; A61G 5/1043; A61G 5/1045; A61G 7/057;
(Continued)

(56) References Cited

U.S. PATENT DOCUMENTS 5,558,398 A * 9/1996 Santos .................... A47C 7/46 297/284.6
9,339,407 B2 * 5/2016 Bhat ..................... A47C 27/00
(Continued)

FOREIGN PATENT DOCUMENTS

GB 2370222 A 6/2002
WO 2011082176 A1 7/2011

OTHER PUBLICATIONS

International Search Report for PCT Application No. PCT/GB2019/052549 dated Dec. 4, 2019.
(Continued)

*Primary Examiner* — Fredrick C Conley
(74) *Attorney, Agent, or Firm* — DLA Piper LLP (US)

(57) ABSTRACT

A method of supporting a body part (16), comprising providing a device (100) comprising: a first portion (105) configured to support a body part, wherein, in use, the body part applies a first pressure to the first portion in a first direction; means for detecting the first pressure; and a second portion (115) having means (212) for applying a second pressure to the body part in a second direction substantially perpendicular to the first direction; detecting the first pressure; determining the second pressure based on a user parameter; and applying the second pressure to the body part in the second direction at a pre-determined ratio relative to the first pressure using said means for applying the second pressure.

19 Claims, 8 Drawing Sheets

(51) Int. Cl.
*A61G 5/10* (2006.01)
*A61G 7/057* (2006.01)

(58) Field of Classification Search
CPC ............ A61G 7/05769; A61G 2203/30; A61G 2203/34; A47C 27/00; A47C 27/08; A47C 27/081; A47C 27/083
See application file for complete search history.

(56) References Cited

U.S. PATENT DOCUMENTS

| | | | | |
|---|---|---|---|---|
| 2007/0008156 | A1* | 1/2007 | Ueda | A47C 20/04 340/575 |
| 2013/0092175 | A1* | 4/2013 | Bhat | A61F 5/01 128/845 |
| 2013/0180531 | A1* | 7/2013 | Choi | A61G 7/05769 128/889 |
| 2013/0255699 | A1 | 10/2013 | Squitieri | |
| 2018/0027988 | A1* | 2/2018 | Poodeh | G06N 20/20 |
| 2020/0155337 | A1* | 5/2020 | Choi | A61G 5/1043 |

OTHER PUBLICATIONS

Great Britain Search and Examination Report for GB 1814813.0 dated Feb. 28, 2019.

* cited by examiner

DEVICE FOR SUPPORTING A BODY PART

CLAIM OF PRIORITY

This application is a National Stage Application of PCT Application No. PCT/GB2019/052549 filed on Sep. 12, 2019 titled "Device For Supporting A Body Part" which in turn claims priority to Application No. GB1814813.0 filed on Sep. 12, 2018, each of which is incorporated herein by reference in its entirety.

This invention relates to a device for supporting a body part.

BACKGROUND

Pressure ulcers affect elderly, neurologically compromised (e.g. individuals with spinal cord injuries) or immobile people (e.g. those wearing a prosthesis, body brace or plaster cast or pregnant women). Ulcers can develop during hospital stays or at home or a care facility as individuals remain bed-ridden or seated for prolonged periods of time.

Current support surfaces (beds, mattresses and cushions) have been designed to redistribute interface pressures between the surface and the skin—either by moulding around the shape of the patient to distribute their weight over a larger contact area (constant low-pressure devices) or by varying the pressure beneath the patient mechanically (alternating-pressure). Surfaces including foam layers of different hardness, thickness and shape have been incorporated into prior art devices to redistribute underbody pressures to little effect.

These support surfaces work on the principle that reducing the peak pressures beneath the body will reduce the risk of developing an ulcer. However, this principle is flawed, as soft tissues are known to be able to tolerate very high peak pressures, for example when diving in deep water. Rather, it has been determined that soft tissues are unable to tolerate large shape changes well, because such large shape changes can result in the collapse of blood vessels and capillary beds in the soft tissue. Devices that reduce peak pressures beneath the body are expensive to produce and their use results in hospitals and individuals incurring considerable expense for devices that are ineffective.

The device of the present invention seeks to alleviate at least some of these disadvantages.

BRIEF SUMMARY OF THE DISCLOSURE

Viewed from a first aspect, the present invention provides a method of supporting a body part, comprising: providing a device comprising: a first portion configured to support a body part, wherein, in use, the body part applies a first pressure to the first portion in a first direction; means for detecting the first pressure; and a second portion having means for applying a second pressure to the body part in a second direction substantially perpendicular to the first direction. The method further comprises detecting the first pressure; determining the second pressure based on a user parameter; and applying the second pressure to the body part in the second direction at a pre-determined ratio relative to the first pressure using said means for applying the second pressure.

Thus, the present invention provides a way of reducing the risk of ulceration of a body part, by reducing the bulging of soft tissue under bony prominences when a load is applied to the body part. This approach advantageously reduces deformations deep within the tissue, where pressure ulcers originate, compared to prior art solutions which seek to reduce the risk of ulceration by redistribution of the under-body pressures to reduce the peak under-body pressure.

The user parameter may comprise one or more of: waist size; body mass index; and mass. This advantageously provides a way of determining a second pressure based on a physical property of the user. The pre-determined ratio of the second pressure to the first pressure may be between 0.6 and 0.8.

The means for applying the second pressure may be arranged to: increase the second pressure if the ratio between the second pressure and the first pressure is below the pre-determined ratio, or decrease the second pressure if the ratio between the second pressure and the first pressure is above the pre-determined ratio. This advantageously allows for adjustments to be made to the second pressure to account for changes in the first pressure, thereby maintaining a desired ratio of second pressure to first pressure. The first direction may be substantially vertical. Thus, the second direction may be horizontal and the second pressure may be a lateral pressure.

Viewed from a further independent aspect, the present invention provides a device for supporting a body part, comprising: a first portion configured to support the body part; means for detecting a first pressure applied by the body part to the first portion in a first direction; and a second portion having means for applying a second pressure to the body part from a second direction substantially perpendicular to the first direction. The means for applying the second pressure is configured to apply the second pressure in the second direction at a pre-determined ratio relative to the first pressure.

The device may comprise a base portion. The means for applying the second pressure to the body part may comprise a mechanical linkage connected to the base portion. The mechanical linkage may be connected to the first portion at a first end, the mechanical linkage may be connected to the second portion at a second end, and the mechanical linkage may be arranged to translate said first pressure applied in the first direction into said second pressure applied to the body part in the second direction. This advantageously provides a passive mechanical device that can use the user's own weight to apply the second pressure at the correct ratio.

The mechanical linkage may be pivotally connected to the base portion at a pivot point. The mechanical linkage may comprise a first arm having a first length extending from the pivot point to the first portion and a second arm having a second length extending from the pivot point to the lateral support. The mechanical linkage may be configured to pivot about the pivot point upon application of the first pressure, and the second arm may be configured to apply the second pressure at the pre-determined ratio based on the proportion of the second length to the first length. This advantageously provides a passive device that can simply translate pressure applied in the first direction, to pressure applied, at the correct ratio, in the second direction.

The first arm may be substantially perpendicular to the second arm, and the first arm may be substantially perpendicular to the first direction. The proportion of the second length to the first length may be in the range of 1.25 to 1.65. The means for applying the second pressure may further comprise one or more of: a dash-pot; a resiliently deformable element; a pulley; and a conical roller. This advantageously provides a passive way of controlling how the second pressure is applied.

The first portion may comprise a first bladder, the second portion may comprise a second bladder in fluid communication with the first bladder via a first valve, and the first valve may be configured to maintain the ratio between the first and second pressures at the pre-determined ratio. This advantageously provides a passive pneumatic device that can use the user's own weight to apply the second pressure at the correct ratio.

The device may comprise a fluid reservoir configured to pump fluid into the second bladder via a second valve when the pressure differential between the fluid reservoir and the second bladder is larger than a threshold, and a third valve arranged to fluidly connect the first bladder with ambient air.

Any of the first, second or third valves may be manually adjustable. This advantageously provides the user or their career the ability to adjust the device, for example, to enhance user comfort levels. The second bladder may comprise one or more baffles arranged to maintain the shape of the bladder.

The device may comprise a first pressure sensor configured to measure a first contact pressure on the first portion, a second pressure sensor configured to measure a second contact pressure on the second portion, and a controller having a memory for storing the pre-determined ratio. The controller may be in data communication with the first pressure sensor, the second pressure sensor, and the means for applying the second pressure. The controller may be configured to calculate the ratio between the second contact pressure and the first contact pressure. The controller may be configured to compare the calculated ratio with the pre-determined ratio. The controller may be configured to actuate the means for applying the second pressure such that the second pressure is applied at the pre-determined ratio to the first pressure. This advantageously provides a device which actively monitors and controls the application of the second pressure based on the contract pressure applied by the body part to the device.

The first and second portions may comprise respective contact surfaces configured to contact the body part. The first pressure sensor may comprise a first sensor array configured to measure a pressure distribution across the first contact surface. The second pressure sensor may comprise a second sensor array configured to measure a pressure distribution across the second contact surface. The controller may be configured to calculate respective first and second peak pressures at the first and second contact surfaces based on the pressure distribution data received from the respective first and second sensor arrays, and the calculated ratio may be based on the calculated first and second peak pressures. By measuring a pressure distribution, the device can more accurately determine what the contact pressure is between the body part and the device and determine an appropriate second pressure to apply to the body part.

The means for applying the second pressure may comprise: a fluid reservoir, and a bladder in fluid communication with the fluid reservoir via a first valve. The controller may be in data communication with the fluid reservoir, and the controller may be configured to pump fluid from the fluid reservoir into the bladder such that the second pressure is applied at the pre-determined ratio to the first pressure. By actively monitoring the contact pressure of the body part, the device is able to dynamically control the level of inflation and deflation of the bladder.

The means for applying the second pressure may comprise: a motor and at least one tensile element. The at least one tensile element may extend between the motor at a first end and an inner surface of the bladder at a second end. The controller may be in data communication with the motor, and the controller may be configured to change the tension in the at least one tensile element, whereby to control the shape of the bladder. This advantageously provides a device where the bladder itself may be deformed, contracted or expanded using a system of tensile elements, which avoids the dependency of the device on a pressurised fluid source.

The controller may be configured to change the tension in the at least one tensile element in order to maintain the shape of the bladder or increase the volume of the bladder. The first bladder may comprise one or more baffles arranged to maintain the shape of the bladder. This advantageously provides a device which can maintain the contact surface pressing against the body part as the internal pressure of the bladder is changed.

The means for applying the second pressure may comprise: a motor and at least one member secured to the motor. The controller is configured to press the at least one member against the body part such that the second pressure is applied at the pre-determined ratio to the first pressure. This advantageously provides a device which may apply the second pressure in a directed manner.

The means for applying the second pressure may comprise a linear actuator connected to the motor. The linear actuator may be arranged to press the at least one member against the body part.

The means for applying the second pressure may comprise a hydraulic piston connected to the at least one member, and the controller may be configured to drive the hydraulic piston.

The means for applying the second pressure may comprise: extending means arranged to urge the means for applying the second pressure towards the body part. This advantageously allows one device to be used for multiple body sizes.

The device may comprise an external frame arranged to provide a surface against which the means for applying the second pressure can react. The external frame may be wearable by a user. By providing a wearable device, a user is not restricted to a single location where the device is located but is able to take the device with them and use it as required. The device may comprise means for securing the device to a chair.

Viewed from a further independent aspect, the present invention provides a wheelchair comprising the external frame according to the claims. Such a wheelchair would significantly reduce the risk of ulceration in users who may be seated for extended periods of time. A further advantage of a wheelchair according to the present invention would be the ability to incorporate and integrate the means for applying the second pressure into components that are essential to a wheelchair, such as seat, back and arm panels and rests. A yet further advantage of incorporating the device of the present invention into a wheelchair is the ability to store bulky components, such as a fluid reservoir, within spaces of the wheelchair that would otherwise be unused.

All scientific and technical terms used herein have meanings commonly used in the art unless otherwise specified. The definitions provided herein are to facilitate understanding of certain terms used frequently herein.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

BRIEF DESCRIPTION OF THE DRAWINGS

Embodiments of the invention are further described hereinafter with reference to the accompanying drawings, in which.

DETAILED DESCRIPTION

Figure 1A:
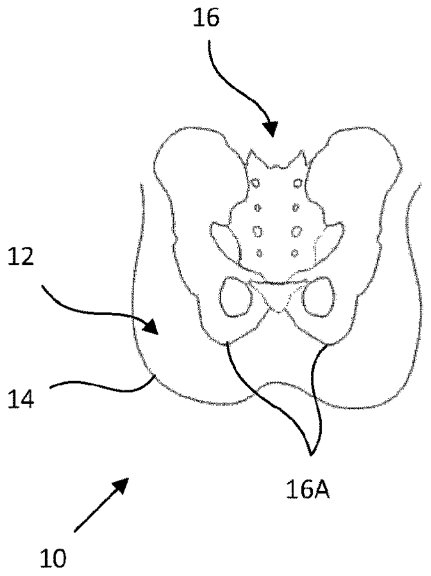
FIGS. 1A and 1B illustrate cross-sectional views of a user when unseated and seated viewed in the frontal plane.
Figure 1B:
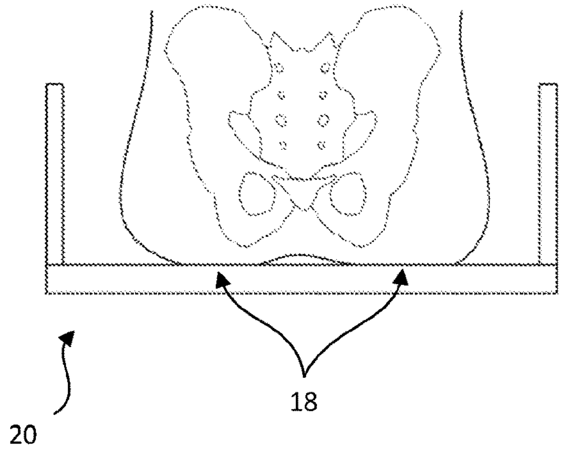
Figure 2A:
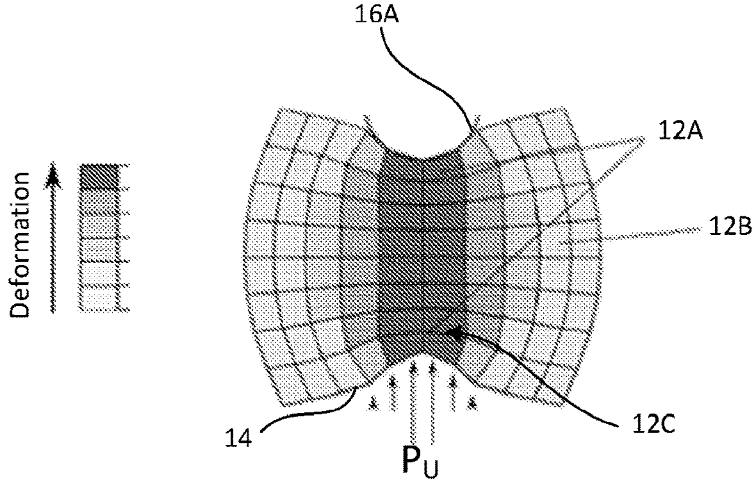
FIGS. 2A and 2B are graphical representations showing the effect of pressure redistribution on soft tissue deformation under and at a bony prominence.
Figure 2B:
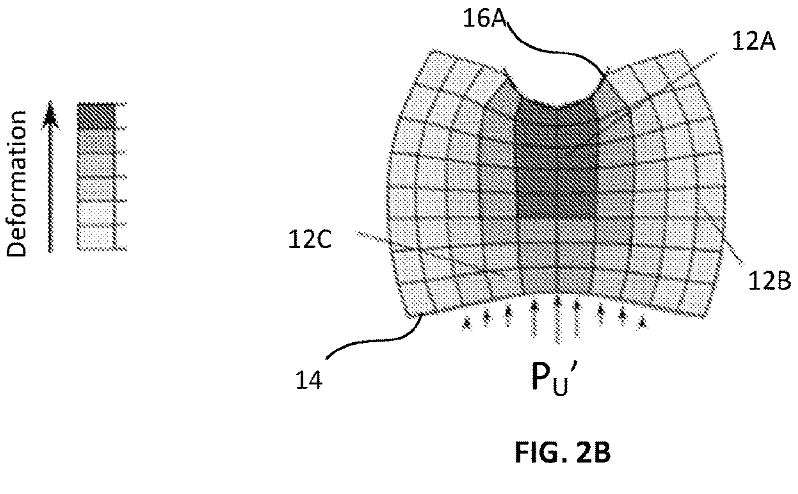

FIGS. 1A and 1B illustrate cross-sectional views of a user when unseated and seated, respectively. The user's waist 10 is represented by a pelvis 16, soft tissue 12 surrounding the pelvis 16 and a layer of skin 14 covering the soft tissue 12. The pelvis 16 has two ischial tuberosities 16A which act as bony prominences for soft tissue 12 to attach to. The ischial tuberosities also press into the soft tissue 12 when the user is seated. As the user sits down, they will typically make contact with a seat 20 at one or more contact sites 18 before placing more of their body weight onto the seat 20 through their pelvis 16. As more load is applied through the pelvis, the soft tissue 12 surrounding the pelvis 16 bulges (see FIG. 1B). When a user is seated on a seat, tissue in close proximity to the ischial tuberosity 16A of the pelvis 16, subsequently referred to as "deep tissue" 12A, deforms considerably and causes surrounding tissue 12B to bulge laterally away from the ischial tuberosity 16A (see FIG. 2A). Further, the presence of a protrusion on the seat can generate large peaks in underbody pressure, $P_U$, at the skin layer 14 and cause considerable deformation of tissue adjacent to the skin layer 14, subsequently referred to as "superficial tissue" 12C. Pressure redistribution reduces peak underbody pressures, $P_U'$, which reduces the deformation of superficial tissue 12C (see FIG. 2B). However, the lateral bulging of soft tissue 12B and deformation of the deep tissue 12A are largely unaffected by the redistribution of pressure. As soft tissue 12 is much more resistant to dilation stresses, which act to compress or expand soft tissue 12, compared to deviatoric stresses, which act to deform or shear soft tissue 12, the ineffectiveness of pressure redistribution devices may be associated with the modelled lack of change in deviatoric stresses in the deep tissue 12A. Therefore, reducing the deviatoric stresses in deep soft tissue 12A may be one way of reducing the risk of ulceration in users. While the users are typically patients, it would be apparent that the present invention may benefit other users who are seated for prolonged periods of time, such as the elderly.

Figure 3:
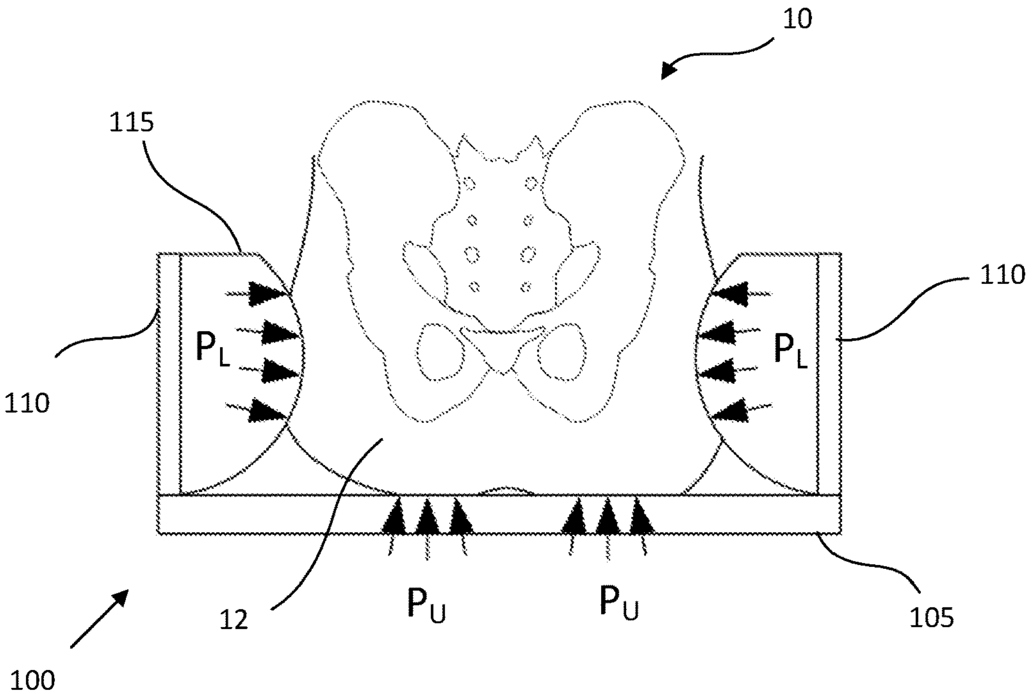
FIG. 3 illustrates a cross-sectional view of a device for applying lateral pressure viewed in the frontal plane.
Figure 4:
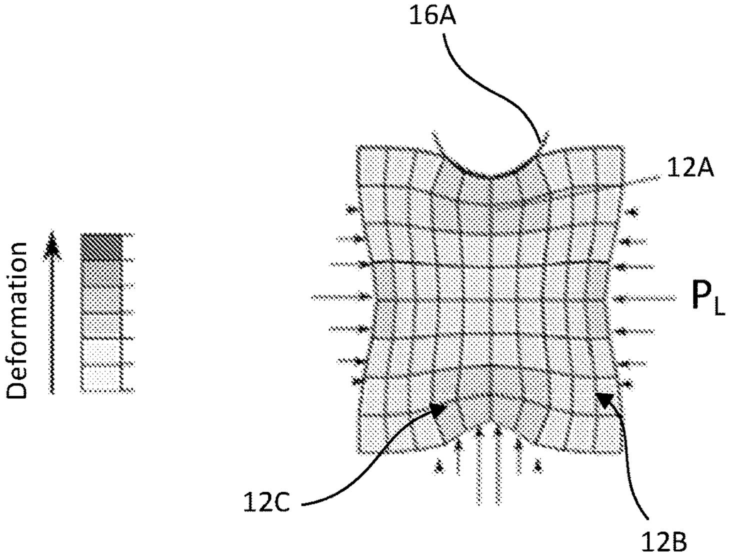
FIG. 4 is a graphical representation showing the effect of applying lateral pressure on soft tissue deformation under and at the bony prominence.

FIG. 3 illustrates a cross-sectional view of a device 100 for applying lateral pressure to the user 10 to prevent bulging of the soft tissue 12 surrounding the pelvis 16. The device 100 includes a seat portion 105, two side sections 110 and a contact portion 115 on each of the side portions 110 that can be brought into contact with the user 10 to apply a lateral pressure, $P_L$, to the user 10. The contact portion 115 may be an inflatable bladder or pad, or similar device. By determining the underbody pressure $P_U$ and applying a lateral pressure $P_L$ based on the underbody pressure, bulging of the soft tissue 12B can be substantially reduced. This in turn reduces the deviatoric stresses in the deep tissue 12A, as the soft tissue 12 is being deformed less and is placed under less strain (see FIG. 4). The combination of lateral pressure and underbody pressure results in loading conditions that are more representative of the application of hydrostatic pressure, which soft tissue 12 is known to be more resistant to. A ratio of lateral pressure to underbody pressure in the range of 60-80% is thought to be particularly effective. That is to say, it is desirable to have the lateral contact 115 exert a pressure that is between 60% to 80% of the pressure exerted by the user 10 on the seat portion 105. However, in some cases it may be desirable to apply lateral pressure outside of this range. In one example, lateral pressure may be applied at 50% underbody pressure. In a further example, lateral pressure may be applied at 90% underbody pressure. In some cases, lateral pressure may be applied at a level under 50% of underbody pressure or at a level above 90% of underbody pressure. In some cases, it may be desirable to determine the lateral pressure based on one or more parameters of the user 10. Such parameters may include the user's waist size; body mass index (BMI); and mass. For example, a user with a high BMI may require a higher lateral pressure to prevent deformation of the soft tissue 12 compared to someone with a lower BMI. The determination of the lateral pressure on the basis of user parameters may be used independently of the predetermined ratio or be used in conjunction therewith, for example to adjust the ratio. One device 100 may be adjustable to accommodate both users.

Figure 5A:
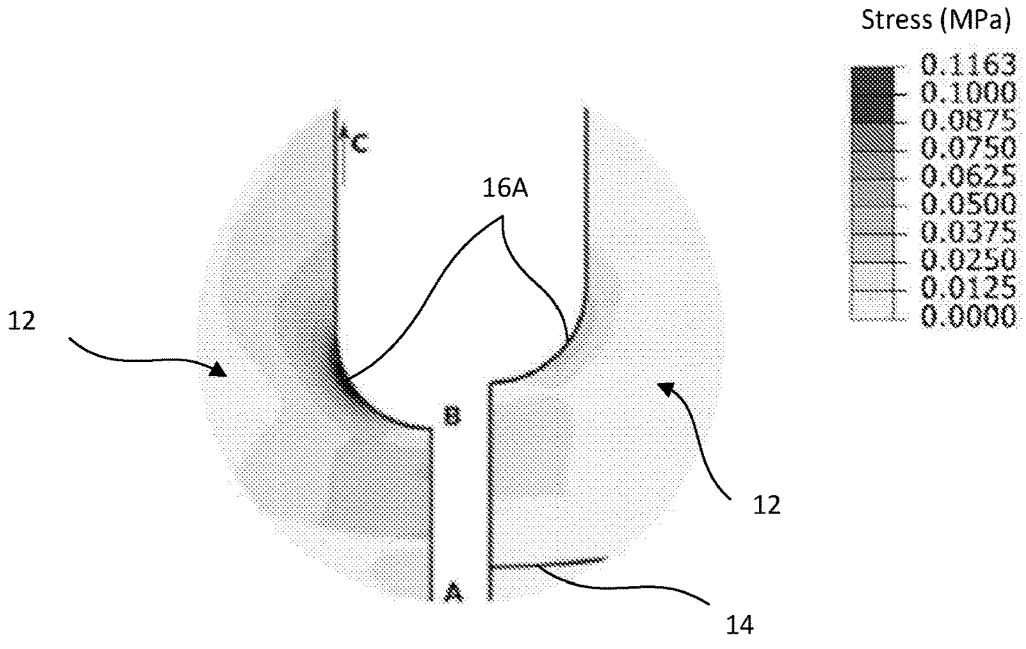
FIGS. 5A and 5B are graphical representations of the effect of applying lateral pressure on the internal pressures under and at the bony prominence.
Figure 5B:
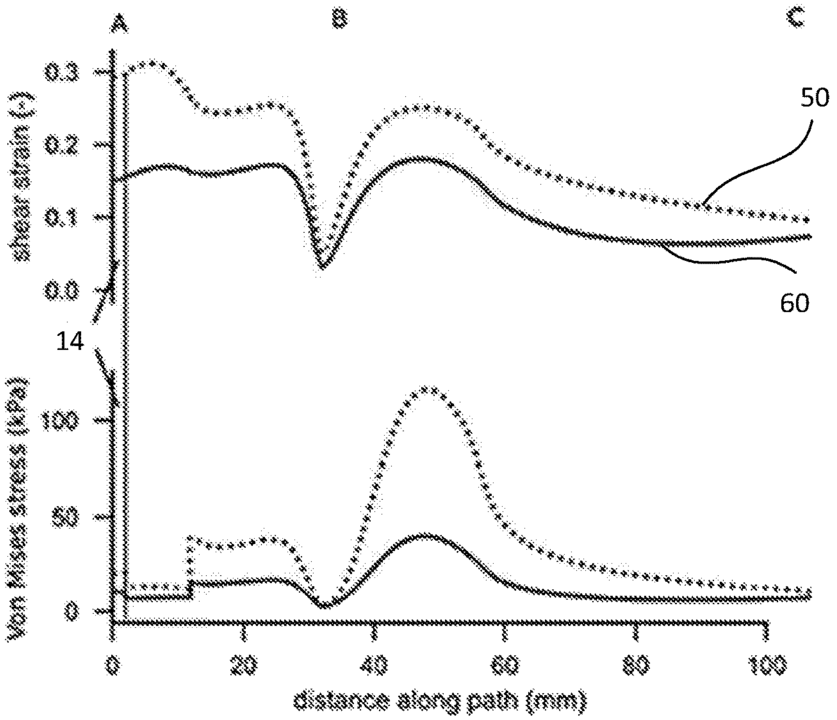

FIGS. 5A and 5B are graphical representations of the effect of applying lateral pressure on the internal pressures under and at the bony prominence 16A. Von Mises stress data is presented graphically in FIG. 5A and linearly in FIG. 5B. FIG. 5B further presents shear strain data. In FIG. 5B, data is presented with respect to a distance along a virtual path extending from point A to point B to point C. Point A is at the skin layer 14, point B is in close proximity to the ischial tuberosity 16A and point C is away from the bony prominence in a superior direction. As shown in FIGS. 5A and 5B the shear strain and von Mises stresses within the soft tissue 12 are significantly higher when there is no lateral pressure applied (left half of FIG. 5A; line 50 in FIG. 5B) compared with when lateral pressure is applied (right half of FIG. 5A; line 60 in FIG. 5B). As the ischial tuberosity 16A presses into the soft tissue 12 significantly higher stresses will develop in the soft tissue 12 adjacent to and in close proximity to the ischial tuberosity 16A when no lateral pressure is applied to the soft tissue 12.

Therefore, the application of lateral pressure in combination with underbody pressure may result in loading conditions on the soft tissue 12 that is more similar to hydrostatic loading. In turn, this reduces the deformation and shear stresses and strains on the deep tissue 12A and ultimately results in a reduced risk of ulceration in users of the device 100. The subsequent description relates to exemplary devices that can be used to apply lateral pressure in the required manner. While the devices are described in the context of the pelvis, it would be apparent that other body parts where ulceration occurs, such as the heel, may benefit from this approach.

Figure 6A:
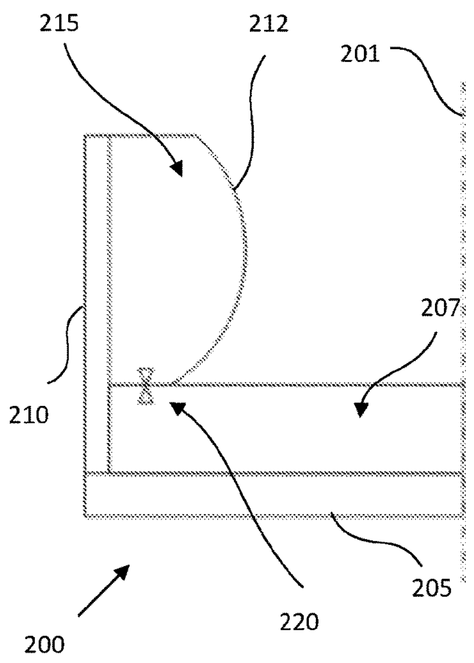
FIG. 6A illustrates a cross-section of a device having a bladder for applying lateral pressure viewed in a vertical plane.

FIG. 6A illustrates a cross-section of a device 200 having a bladder 212 for applying lateral pressure viewed in a vertical plane. FIG. 6A shows one of two sides of the device 200, with line 201 representing the division between two sides of the device 200. For conciseness, only one side of the device will be described, but it would be apparent that one or more features presented on the illustrated side could be present on the second side.

The device 200 has a seat portion 205 secured to a side portion 210 with the bladder 212 secured thereto. The bladder 212 is shown with an underbody chamber 207 attached to the seat portion 205 and a lateral chamber 215 attached to the side portion 210. A valve 220 connecting the underbody chamber 207 to the lateral chamber 215 allows fluid, typically air, to flow between the underbody chamber 207 and the lateral chamber 215. The valve 220 further allows a pressure differential to be maintained between the underbody chamber 207 and the lateral chamber 215. When a user sits on the seat portion 205, the pressure within the underbody chamber 207 rises. Once the pressure differential across the valve 220 is above a threshold, fluid is able to flow from the underbody chamber 207 into the lateral chamber 215 and cause the lateral chamber 215 to press sideways against the user. The threshold of the valve 220 is set to maintain the desired ratio of lateral pressure to underbody pressure. The threshold of the valve 220 may be based on user parameters. Such a device 200 could be considered to have different "sizes". A user 10 would simply select, or be prescribed, a device 200 that was adapted for them and inflate the device 200 when required. When the user 10 sits on the bladder 212, the valve 220 would allow the required amount of air to flow from the underbody chamber 207 into the lateral chamber 215 such that the desired pressure ratio was maintained. For example, the user may exert an underbody pressure of 10 kPa and a second user may exert an underbody pressure of 20 kPa. Both users may be provided with a device able to maintain a pressure differential of 4 kPa across the valve 220. With this device 200, the first user would experience a lateral pressure of 6 kPa and the second user would experience a lateral pressure of 16 kPa, providing ratios of lateral to underbody pressure of 0.6 and 0.8 respectively. Providing an adjustable valve allows one device 200 to be compatible with a wider demographic of users. One example of an adjustable valve is a differential pressure control valve.

Figure 6B:
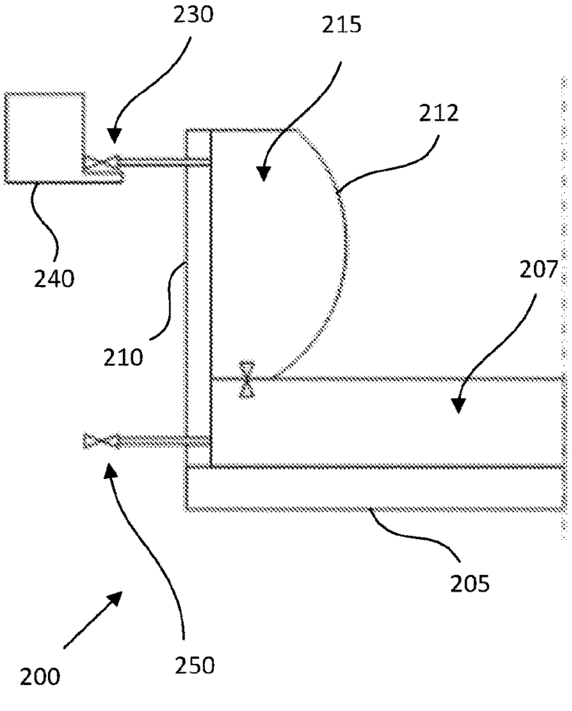
FIG. 6B illustrates an alternative embodiment of the device of FIG. 6A.

FIG. 6B illustrates an alternative pneumatic device 200 having a similar bladder 212 to that described in relation to FIG. 6A. The device 200 of FIG. 6B also has a pressurised fluid reservoir 240 connected to the lateral chamber 215 by a second valve 230, and a third valve 250 connecting the underbody chamber 207 to the ambient environment or a fluid sink or reservoir (not shown). Any of the first 220, second 230 and third 250 valves may be flow-control valves. The ambient environment is typically at standard temperature and pressure. The fluid reservoir 240 can be used to pump additional fluid into the lateral chamber 215, for example, when the pressure differential across the first valve 220 does not result in sufficient lateral pressure. This may be necessary when the lateral chamber 215 is unable to contact the user, for example, if the user is smaller than the device typically supports. In this case, the reservoir 240 may pump fluid into the lateral chamber 215 to expand the lateral chamber 215 until contact is made with the user and the lateral chamber 215 is able to apply the desired amount of lateral pressure. The third valve 250 provides a way to reduce the pressure within the underbody chamber 207, for example, when the bladder 212 has been previously inflated using the reservoir 240 and the additional pressure is no longer suitable for a different user. In some cases, the fluid sink or reservoir downstream of the third valve 250 is connected to the pressurised fluid reservoir 240 to form a closed loop system that can provide the desired ratio of lateral to underbody pressures by continuously pumping fluid around the system. In one example, the fluid reservoir 240 is pressurised to at least 100 kPa and is configured to pump fluid into the bladder 212 at up to 100 kPa. A controller (not shown) configured to adjust the valves 220, 230, 250 can ensure the lateral 215 and underbody 207 chambers are pressurised to the desired level by selectively operating the valves 220, 230, 250 to ensure the pressure levels of each chamber 207, 215 are as desired. In one example, the controller may operate the valves periodically. The controller may operate the valves every 5 to 10 minutes. An alternative flow-control system without a controller may be used. In this case, setting the flow rate of fluid from the reservoir 240 based on a parameter of the valves 220, 230, 250, such as the flow coefficient, allows for the desired pressure differential to be maintained. Adjusting the pressure within the lateral 215 and underbody 207 chambers using the valves 220, 230, 250 can also be used to improve user comfort when seated in the device 200. The device 200 may be retrofitted to—or form part of—a standard wheel chair or chair with rigid sides. This will be described in greater detail below. Any of the valves 220, 230, 250 may be adjustable, either manually or by a controller (not shown). An adjustable valve provides a way of changing under what conditions the valve opens and closes, which can allow a user to tune the ratio of lateral to underbody pressure, for example. The bladder 212 is preferably made from a flexible material capable of maintaining a pressure of up to 100 kPa above atmospheric pressure. In most cases, a lateral pressure of 15 kPa will be sufficient. 15 kPa has also been found to be a threshold above which user comfort begins to decrease. One such material is polyurethane. The bladder 212 may be provided with one or more internal baffles (not shown) to control the final shape of one or more of the chambers 207, 215. While a single underbody chamber 207 and a single lateral chamber 215 have been described, it would be apparent that either of the chambers 207, 215 may be divided further into a series of interconnected cells.

Figure 7:
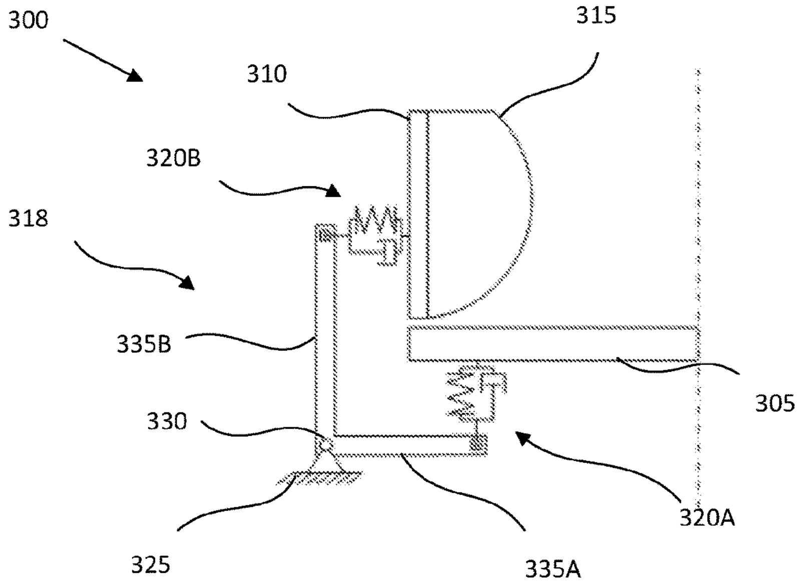
FIG. 7 illustrates a cross-sectional view of a device having a mechanical system for applying lateral pressure.

FIG. 7 illustrates a cross-sectional view of a device 300 having a mechanical system for applying lateral pressure. The device 300 has a seat portion 305 and a side portion 310 having a pad 315 secured thereto. The seat portion 305 and side portion 310 are secured to a support 325 by a mechanical system 318. In one embodiment, the mechanical system includes a linkage mechanism 335 pivotally mounted 330 to the support 325. The linkage mechanism 335 is arranged to translate force applied in one direction into force applied in a second direction. Specifically, the linkage mechanism 335 translates displacement of the seat portion 305 in the vertical direction into displacement of the side portion 305 in a lateral or substantially horizontal direction. In one example, the linkage mechanism 335 has a horizontal arm 335A extending from the pivotal connection 330 to the seat portion 305 a side arm 335B extending from the pivotal connection 330 to the side portion 310 in a substantially perpendicular direction to the horizontal arm 335A. As shown in FIG. 7, a user sitting on the seat portion 305 will cause the seat portion 305 to lower (vertically) and the linkage mechanism 335 to rotate clockwise and push the pad 315 attached to the side portion 310 laterally into the user. The desired ratio of lateral to underbody pressure can be controlled by selecting the correct ratio of lengths of the horizontal 335A and side 335B arms. The length of the side arm 335B is preferably 1.25 to 1.65 the length of the horizontal arm 335A. This has been found to achieve the desired ratio of lateral to underbody pressure. While a pivoting linkage mechanism 335 has been illustrated here, it would be apparent that other components suitable for translating load from a first direction to a substantially perpendicular second direction may be used in the present invention. For example, alternative linkage mechanisms, lever arms, gears, rotational springs or similar components may be used to translate force from the first to the second direction. To control the application of lateral force, a control arrangement may be incorporated into the mechanical system 318. In one example, a first spring-dash-pot arrangement 320A is disposed between the seat portion 305 and the end of the horizontal arm 335A and a second spring-dash-pot arrangement 320B is disposed between the side portion 310 and the end of the side arm 335B. While the illustrated control arrangements 320A, 320B each include a spring and dashpot arranged in parallel, it would be apparent to the skilled person that other elements, such as pulleys, gears, conical rollers or other resiliently deformable members may be used in place of, or in addition to, the illustrated arrangement. Further, more or fewer springs and dashpots may be used to control the ratio of force applied through the side arm 335B compared to the horizontal arm 335A.

One exemplary device may comprise cone wheel gears connected the horizontal 335A and vertical 335B arms. In this case the amount of lateral pressure can be varied by adjusting the gear ratio provided by the gears. This adjustment may be made by the user or a career or medical professional. Alternatively, the device 300 may comprise a system of pulleys or gears to apply lateral pressure at the desired ratio. A further exemplary device 300 may comprise a first rack and pinion arrangement (not shown) attached to the seat portion 305, a second rack and pinion arrangement (not shown) attached to the side portion 310 and one or more gears linking the first and second rack and pinion arrangements. In this case, displacement of the seat portion 310 would drive the first rack in the first direction which would cause the gear associated with the first rack to rotate and drive the gears linking between the first and second rack and pinion arrangements. The rotation of the gears would then result in the displacement of the second rack in the second direction. The gears linking the first and second rack and pinion arrangements may be configured to drive the second rack, and thus press the side portion 310 into the user, with the desired lateral pressure. A gearbox (not shown) may be further included in this example to provide a way of adjusting the ratio of lateral to underbody pressure applied by the rack and pinion arrangements.

Figure 8A:
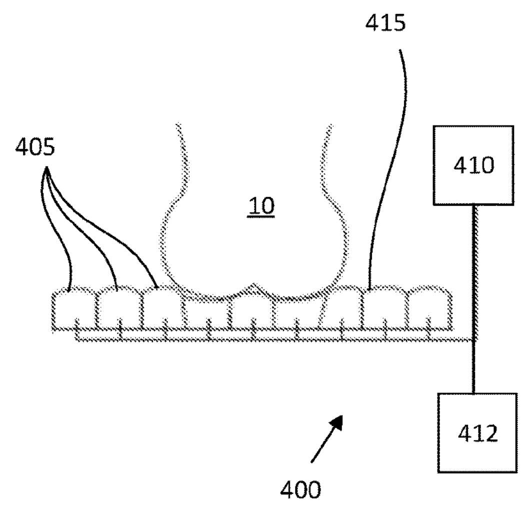
FIGS. 8A and 8B illustrate cross-sectional views of a device for wrapping around the user to apply lateral pressure, in unwrapped and wrapped configurations, respectively.
Figure 8B:
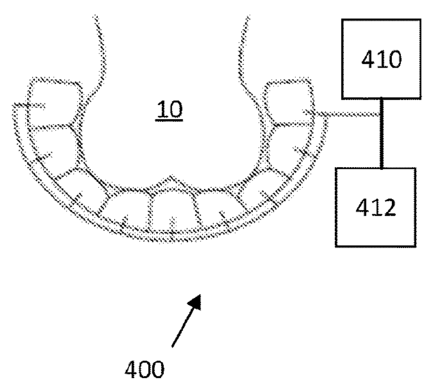
Figure 9:
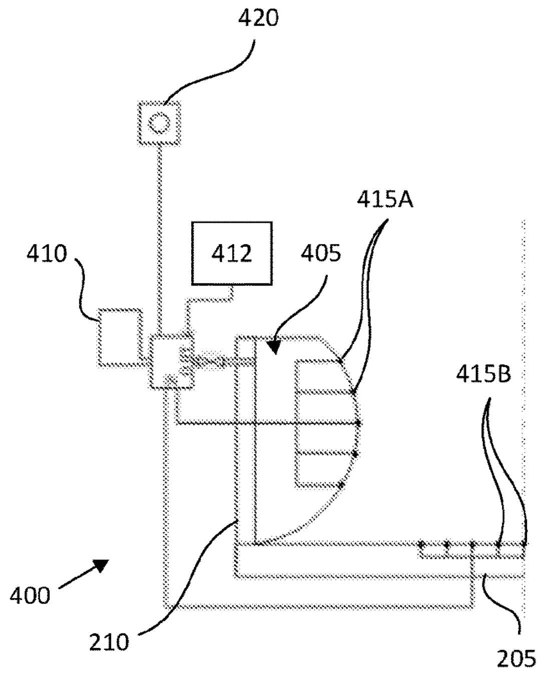
FIG. 9 illustrates a cross-sectional view of a device having a bladder connected to a pressurised fluid reservoir.

FIGS. 8A and 8B illustrate cross-sectional views of a device 400 for wrapping around the user 10 to apply lateral pressure. The device 400 is illustrated in unwrapped (FIG. 8A) and wrapped (FIG. 8B) configurations. In one example, the device 400 has nine inflatable bladders 405 each connected to a pressurised fluid reservoir 410, a controller 412 configured to independently inflate each of the bladders 405 and a pressure sensor 415 disposed across the surface of the bladders 405 and in data communication with the controller 412. By measuring the pressure distribution across the surface of the bladders 405, the controller 412 can ensure there is sufficient lateral pressure in relation to underbody pressure by inflating or deflating individual bladders 405 as required. As the lateral pressure may be applied by inflating specific bladders 405, there may be cases where there is no need for bladders beneath the user 10 (see FIGS. 9 and 10). In this case, the underbody pressure may be determined by a pressure sensor 415B disposed on the seat portion 205 directly. The controller 412 subsequently calculates the appropriate lateral pressure to apply based off the measured underbody pressure. Once the desired lateral pressure is determined, the controller 412 can inflate or deflate the bladders 405 attached to the side portion 210 as required. The amount of lateral pressure is confirmed by a pressure sensor 415A disposed on the surface of the bladder(s) 405 disposed between the bladder(s) 405 and the side of the user 10. While not essential, it is preferable to measure the underbody pressure and lateral pressure to determine whether sufficient lateral support is being provided by the device 400. A user interface 420 connected to the controller 412 is also provided to allow the user to adjust the support provided by the device 400. The user interface may take the form of a button, dial, knob, switch, touch screen or haptic switch. The user interface 420 may be connected to the controller 412 by a wired or wireless connection. The pressure sensors 415A, 415B may be one or more pressure sensor probes providing readings at individual locations, a pressure sensing strip providing readings over a length of material, or a pressure mat for providing readings over an area of the mat. The pressure sensor 415 may include a customised arrangement of piezoelectric sensors arranged to measure underbody and lateral pressures at the necessary locations or may be a commercially available sensor for measuring pressure distribution on a surface.

The peak pressure from the underbody or lateral pressure measurements may be determined by an algorithm. For example, the peak pressure may be determined as the highest value recorded by the pressure sensor. Alternatively, the peak pressure may be determined from a mathematical curve fitted to measured pressure sensor data. One example of this would be to fit an isotropic von Mises distribution curve to the pressure sensor data and take the maximum of the distribution curve as the peak pressure. Alternatively, the controller 412 may use a percentile, for example the 95th percentile, of the measured pressure data and take this as the peak pressure value. The percentile may be pre-programmed or selected by the user. The peak underbody pressure and peak lateral pressure may be determined in different ways. Once the peak lateral and underbody pressure have been determined, the controller 412 can determine the ratio of peak lateral to peak underbody pressure and control the bladder(s) 405 in the manner described above.

Figure 10:
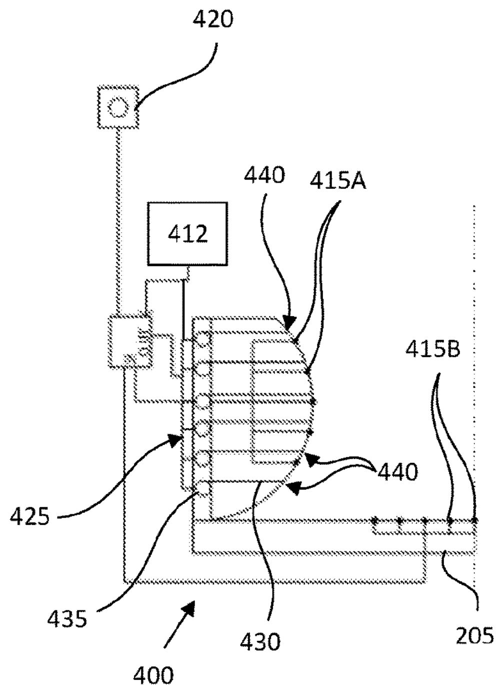
FIG. 10 illustrates a cross-sectional view of a cable system to maintain the shape of a bladder.

FIG. 10 illustrates a cross-sectional view of a cable system 425 to maintain the shape of a bladder 405. In one embodiment, the cable system 425 has six pulleys 435 secured within the side portion 210 of the seat. Each pulley 435 is driven by a motor (not shown) and can apply tension to a cable 430 extending from each pulley 435 to one or more respective attachment points 440 on an inner surface of the bladder 405. The cable system 425 allows the bladder 405 to be kept under high pressure to achieve maximum expansion, while maintaining a desired cross-sectional profile. By increasing or decreasing the tension of each of the cables 430, the controller 412 is able to manipulate the profile of the bladder 405 and/or expand or contract the bladder 405.

Figure 11A:
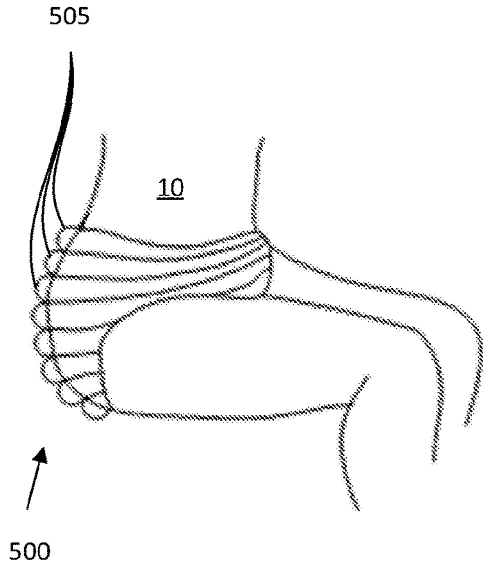
FIGS. 11A, 11B and 11C illustrate a wearable device for applying lateral pressure.
Figure 11B:
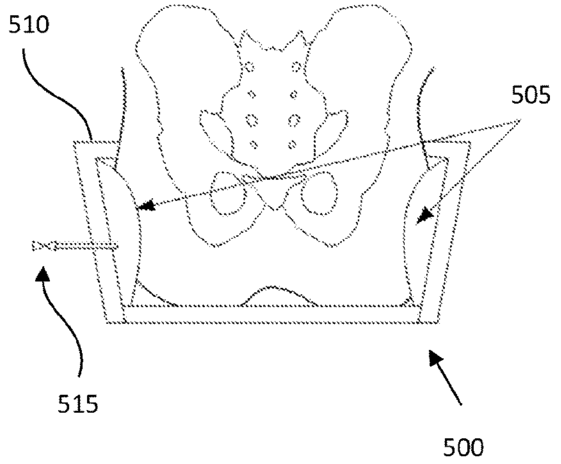
Figure 11C:
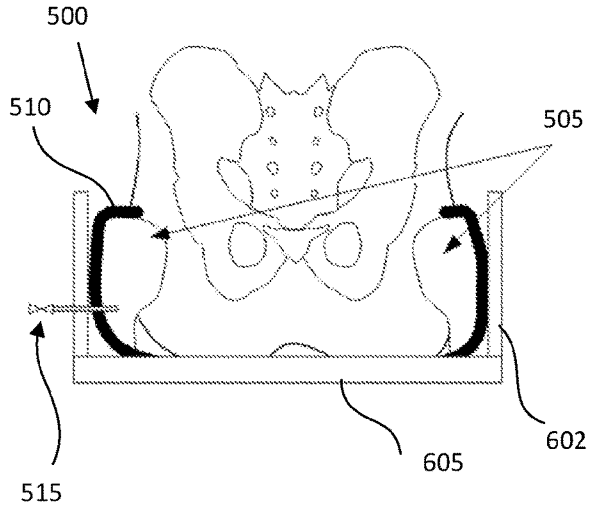
Figure 12:
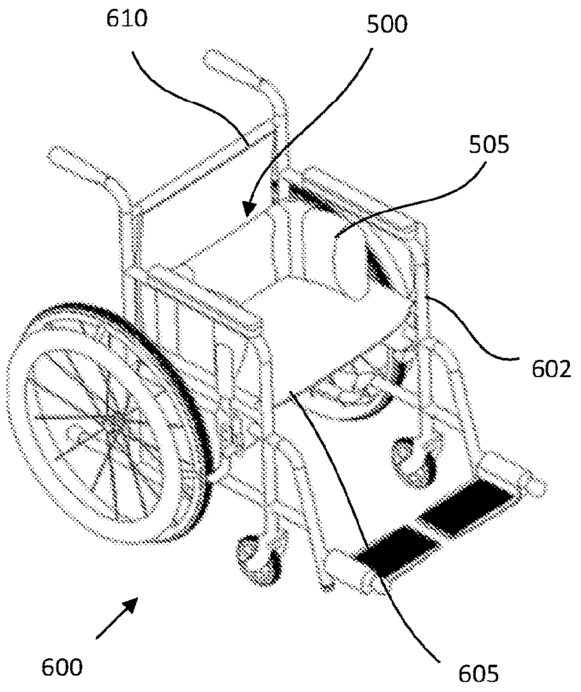
FIG. 12 illustrates a wheelchair incorporating a device for applying lateral pressure.

FIGS. 11A, 11B and 110 illustrate a wearable device 500 for applying lateral pressure. FIG. 11A illustrates one embodiment of the wearable device 500 having eight inflatable bladders 505 that can be inflated or deflated as required to provide the required amount of lateral pressure. FIG. 11B illustrates an alternative embodiment of the wearable device 500 having a support structure 510, a bladder 505 secured to the support structure 510 and a valve 515 connecting the bladder 505 to an external pump (not shown). In this embodiment, the support structure 510 is a rigid structure that provides a reaction surface against when the bladder 505 can apply lateral pressure when inflated. The bladder 505 and support structure 510 preferably incorporate pressure sensors (not shown) to measure the underbody and lateral pressures during operation of the device 500. The device 500 preferably includes a controller to control the operation of the bladder 505 in a similar manner to that described above in relation to the earlier embodiments. The valve 515 may be manually controlled by the user 10 or by a controller (not shown). The external pump may be a hand pump or a pressurised fluid reservoir. FIG. 11C illustrates a further alternative wearable device 500 that is preferably activated only when the user is sat in, for example, a wheelchair 600 having a seat 605, a back 610 and a frame 602 (see also FIG. 12). In this embodiment, the device 500 is placed on the seat 605 and is secured to the wheelchair 600, for example, to the frame 602 or the back 610 of the wheelchair 600. As the frame 602 of the wheelchair provides a rigid structure for the bladder 505 to press against when inflated, there is no need for the wearable device 500 itself to be rigid and thus, the support structure 510 can be made from an elastic or flexible material. Further, as the device 500 is only activated when seated in the wheelchair 600, the external pump can be secured to the wheelchair 600. This provides a more user-friendly device 500, as the user is able to connect the device 500 to the external pump once they are sat in the wheelchair 600 and easily inflate the bladder 505. If the user needs to stand from the chair or adjust the pressure in the bladder 505, the user simply disconnects the device 500 from the external pump and the bladder 505 deflates and the user can get up from the wheelchair 600. This is particularly desirable, as the user 10 is able benefit from the device 500 without having to carry all of the necessary components themselves to inflate and/or deflate the device 500, for example, the external pump. The support structure 510 may incorporate pressure sensors (not shown) to measure the lateral pressures. The wearable device 500 may also extend under the user 10 such that the user 10 sits on the wearable device 500 as opposed to the seat portion 605 of the wheelchair 600. In this case, the underbody pressure sensor may be incorporated in the support structure 510 under the user. Where the device 500 does not extend under the user 10, the pressure sensor used to measure underbody pressure may be incorporated within the wheelchair 600 or disposed on top of the seat portion 605 of the wheelchair 600.

Figure 13:
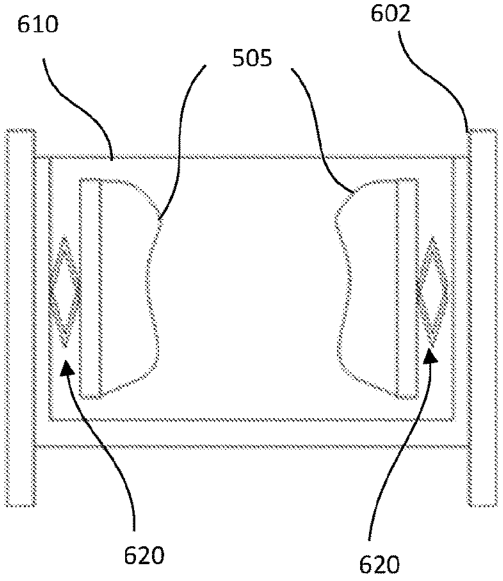
FIG. 13 illustrates a ratchet system for pushing two pads towards the user.

A ratchet system 620 can also be used to bring the bladder(s) 505 into close proximity with the user in a controller manner independently of the internal pressure of the bladder(s) 505 (see FIG. 13). This is desirable as one device 500 can be made suitable for multiple body shapes and sizes. The device 500 preferably includes mounting points (not shown) for securing to the wheelchair frame 602.

Figure 14A:
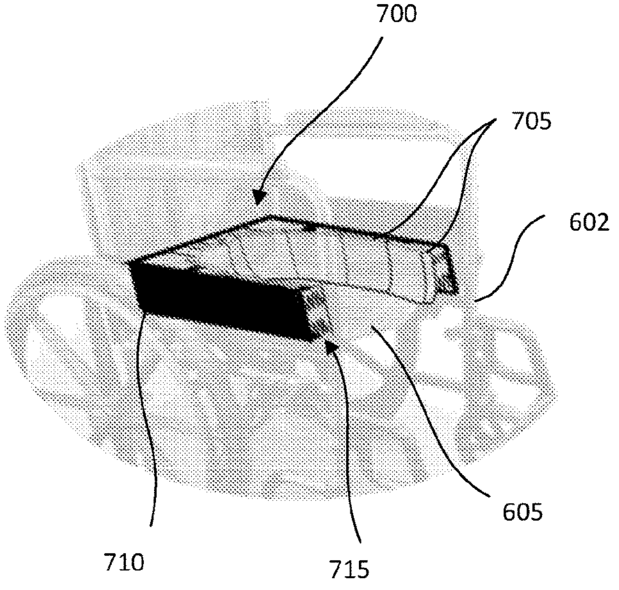
FIGS. 14A and 14B illustrate perspective and plan views of a device having a series of actuated pads for applying lateral pressure.
Figure 14B:
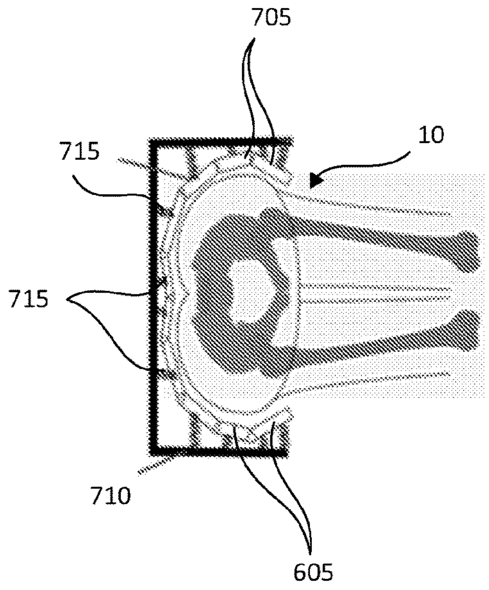
Figure 15A:
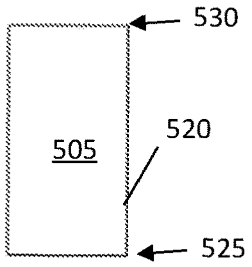
FIGS. 15A to 15H illustrate cross-sectional profiles of exemplary pads and bladders viewed in a vertical plane.
Figure 15B:
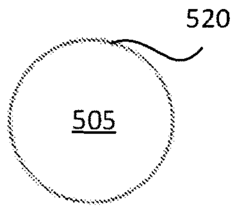
Figure 15C:
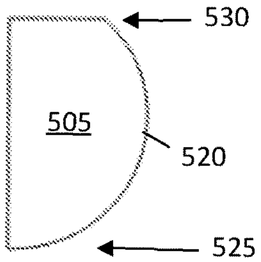
Figure 15D:
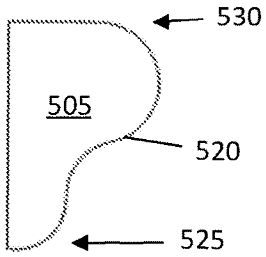
Figure 15E:
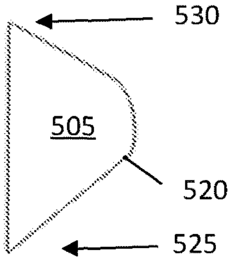
Figure 15F:
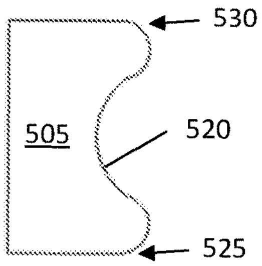
Figure 15G:
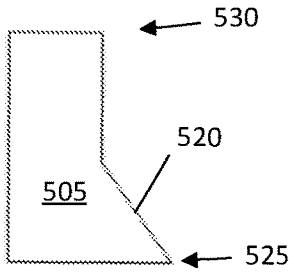
Figure 15H:
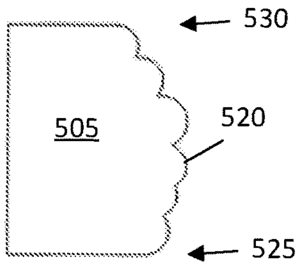

FIGS. 14A and 14B illustrate perspective and plan views of a device 700 having a series of actuated pads 705 for applying lateral pressure. In this embodiment, the pads 705 are secured to a support structure 710 and driven by respective actuators 715 that are controlled by a controller (not shown). The controller receives data from pressure sensors disposed on the pads 705 and seat 605 that measure lateral and underbody pressures respectively. Having received the pressure sensor data, the controller is able to control the actuators 715 to press the pads 705 into the user 10 at the desired level of lateral pressure based on the measured underbody pressure. The controller may be connected to the actuators 715 and pressure sensors be a wired or wireless connection. The actuator 715 may include a linear motor or a hydraulic piston. While this embodiment is described with a series of pads 705, it would be apparent that one or more inflatable bladders would be compatible with this embodiment. The pads 705 may include layers of one or more foams known in the art.

FIGS. 15A to 15H illustrate cross-sectional profiles of exemplary bladders 505 and pads 705 suitable for the presently described devices viewed in a vertical plane. While the subsequent description is directed towards bladders 505, it would be apparent that pads 705 may also have a profile described below. The bladder 505 may have an outer surface defining a profile having a first end 525 and a second end 530 opposed to the first end 525. The outer surface may form a rectangular or substantially circular profile. Alternatively, the outer surface 520 may have an arcuate profile having one or more points of inflexion. The bladder 505 may have a first width at the first end 525 and a second width at the second end 530, and the second width may be larger, smaller or equal to the first width. The widest length of the profile may be between the first 525 and second 530 ends. The shortest length of the profile may be halfway between the first 525 and second 530 ends. The outer surface 520 may have one or more substantially straight sections. The outer surface 520 may have a profile combining one or more substantially curved sections with one or more substantially straight sections. The outer surface 520 may form a series of adjoining arcuate sections. The outer surface 520 may have two or more arcuate sections, each arcuate section having a different radius of curvature.

While the devices have been described in the context of a wheelchair, it would be apparent that the devices may be secured to or retrofitted to other chairs or furniture or medical device. Similarly, while retrofit device may be desirable in some cases, it would be apparent that in other cases, a chair incorporating the elements of the device would be preferable. For example, the device may be incorporated into a bed, an orthotic or a prosthetic.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of supporting a body part, comprising:

providing a device comprising:

a first portion configured to support a body part, wherein, in use, the body part applies a first pressure to the first portion in a first direction;

means for detecting the first pressure; and a second portion having means for applying a second pressure to the body part in a second direction substantially perpendicular to the first direction;

detecting the first pressure;

determining the second pressure based on a user parameter; and applying the second pressure to the body part in the second direction at a pre-determined ratio relative to the first pressure using said means for applying the second pressure to maintain the ratio of the second pressure to the first pressure between 0.5 and 0.9.

2. The method according to claim 1, wherein the user parameter comprises one or more of: waist size; body mass index; and mass.

3. The method according to claim 1, wherein the means for applying the second pressure is arranged to: increase the second pressure if the ratio between the second pressure and the first pressure is below the pre-determined ratio, or decrease the second pressure if the ratio between the second pressure and the first pressure is above the pre-determined ratio.

4. The method according to claim 1, wherein the first direction is substantially vertical.

5. A device for supporting a body part, comprising:

a first portion configured to support the body part;

means for detecting a first pressure applied by the body part to the first portion in a first direction; and a second portion having means for applying a second pressure to the body part from a second direction substantially perpendicular to the first direction;

wherein said means for applying the second pressure is configured to apply the second pressure in the second direction to maintain a pre-determined ratio relative to the first pressure, wherein the pre-determined ratio of the second pressure to the first pressure is between 0.5 and 0.9.

6. The device according to claim 5, further comprising a base portion, wherein the means for applying the second pressure to the body part comprises a mechanical linkage connected to the base portion, wherein the mechanical linkage is connected to the first portion at a first end, wherein the mechanical linkage is connected to the second portion at a second end, and wherein the mechanical linkage is arranged to translate said first pressure applied in the first direction into said second pressure applied to the body part in the second direction.

7. The device according to claim 6, wherein the mechanical linkage is pivotally connected to the base portion at a pivot point, wherein the mechanical linkage comprises a first arm having a first length extending from the pivot point to the first portion and a second arm having a second length extending from the pivot point to the second portion, wherein the mechanical linkage is configured to pivot about the pivot point upon application of the first pressure, and wherein the second arm is configured to apply the second pressure at the pre-determined ratio based on a proportion of the second length to the first length.

8. The device according to claim 5, wherein the first portion comprises a first bladder, wherein the second portion comprises a second bladder in fluid communication with the first bladder via a first valve, and wherein the first valve is configured to maintain the ratio between the first and second pressures at the pre-determined ratio.

9. The device according to claim 8, comprising a fluid reservoir configured to pump fluid into the second bladder via a second valve when a pressure differential between the fluid reservoir and the second bladder is larger than a threshold, and a third valve arranged to fluidly connect the first bladder with ambient air.

10. The device according to claim 5, further comprising a first pressure sensor configured to measure a first contact pressure on the first portion, a second pressure sensor configured to measure a second contact pressure on the second portion, and a controller having a memory for storing the pre-determined ratio, wherein the controller is in data communication with the first pressure sensor, the second pressure sensor, and the means for applying the second pressure, wherein the controller is configured to calculate the ratio between the second contact pressure and the first contact pressure, wherein the controller is configured to compare the calculated ratio with the pre-determined ratio, and wherein the controller is configured to actuate the means for applying the second pressure such that the second pressure is applied at the pre-determined ratio to the first pressure.

11. The device according to claim 10, wherein the first and second portions comprise respective contact surfaces configured to contact the body part, wherein the first pressure sensor comprises a first sensor array configured to measure a first pressure distribution across the first contact surface, wherein the second pressure sensor comprises a second sensor array configured to measure a second pressure distribution across the second contact surface, wherein the controller is configured to calculate respective first and second peak pressures at the first and second contact surfaces based on the first pressure distribution and second pressure distribution received from the respective first and second sensor arrays, and wherein the calculated ratio is based on the calculated first and second peak pressures.

12. The device according to claim 11, wherein the means for applying the second pressure comprises: a fluid reservoir, and a bladder in fluid communication with the fluid reservoir via a first valve, and wherein the controller is configured to pump fluid from the fluid reservoir into the bladder such that the second pressure is applied at the pre-determined ratio to the first pressure.

13. The device according to claim 12, wherein the means for applying the second pressure further comprises: a motor and at least one tensile element, wherein the at least one tensile element extends between the motor at a first end and an inner surface of the bladder at a second end, wherein the controller is in data communication with the motor, and wherein the controller is configured to change a tension in the at least one tensile element, whereby to control a shape of the bladder.

14. The device according to claim 13, wherein the controller is configured to change the tension in the at least one tensile element in order to maintain the shape of the bladder or increase a volume of the bladder.

15. The device according to claim 11, wherein the means for applying the second pressure further comprises:

a motor and at least one member secured to the motor, and wherein the controller is configured to press the at least one member against the body part such that the second pressure is applied at the pre-determined ratio to the first pressure.

16. The device according to claim 15, wherein the means for applying the second pressure further comprises a linear actuator connected to the motor, and wherein the linear actuator is arranged to press the at least one member against the body part.

17. The device according to claim 15, wherein the means for applying the second pressure further comprises a hydraulic piston connected to the at least one member, and wherein the controller is configured to drive the hydraulic piston.

18. The device according to claim 5, comprising an external frame arranged to provide a surface against which the means for applying the second pressure can press.

19. A wheelchair comprising the device according to claim 5.

* * * * *